United States Patent
Hwang et al.

(10) Patent No.: US 9,048,695 B2
(45) Date of Patent: Jun. 2, 2015

(54) WIRELESS POWER TRANSMISSION DEVICE AND METHOD

(75) Inventors: Chan Soo Hwang, Yongin-si (KR); Eun Seok Park, Suwon-si (KR); Sang Wook Kwon, Seongnam-si (KR); Young Tack Hong, Seongnam-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 486 days.

(21) Appl. No.: 12/972,659

(22) Filed: Dec. 20, 2010

(65) Prior Publication Data
US 2011/0156490 A1 Jun. 30, 2011

(30) Foreign Application Priority Data
Dec. 24, 2009 (KR) .................. 10-2009-0130852

(51) Int. Cl.
*H01F 27/42* (2006.01)
*H02J 17/00* (2006.01)
*H02J 7/00* (2006.01)
*H02J 7/02* (2006.01)

(52) U.S. Cl.
CPC .............. *H02J 17/00* (2013.01); *H02J 7/0004* (2013.01); *H02J 7/025* (2013.01)

(58) Field of Classification Search
USPC ........................................................ 307/104
See application file for complete search history.

(56) References Cited

U.S. PATENT DOCUMENTS

| | | | |
|---|---|---|---|
| 6,798,716 B1 | 9/2004 | Charych | |
| 7,657,276 B2 * | 2/2010 | Sakoda | 455/522 |
| 2002/0002470 A1 * | 1/2002 | Arai | 705/1 |
| 2006/0033482 A1 * | 2/2006 | Florence et al. | 323/267 |
| 2008/0137636 A1 * | 6/2008 | Kasslin et al. | 370/346 |

(Continued)

FOREIGN PATENT DOCUMENTS

| | | |
|---|---|---|
| KR | 10-2008-0038683 | 5/2005 |
| KR | 10-2008-0098786 | 11/2008 |
| KR | 10-2009-0006263 | 1/2009 |
| KR | 10-2009-0019310 | 2/2009 |

OTHER PUBLICATIONS

Extended European Search Report issued in counterpart European Patent Application No. 10190763 (Date of completion of the Search: Jun. 27, 2011) (7 pages, in English).

(Continued)

*Primary Examiner* — Jared Fureman
*Assistant Examiner* — Duc M Pham
(74) *Attorney, Agent, or Firm* — NSIP Law

(57) ABSTRACT

A wireless power transmission device and method are provided. An amount of power transmitted wirelessly by the wireless power transmission device may be controlled based on information to be transmitted by the wireless power transmission device, such that the information may be transmitted without using any additional device for information transmission. Additionally, an internal impedance of a terminal may be controlled based on information to be transmitted by the terminal, and a reflected wave of a transmission signal transmitted by the wireless power transmission device may be then controlled, such that the information may be transmitted without using any additional device for information transmission. Therefore, no further device may be desired, and thus a power consumption amount may be reduced, and there may be no need to match a communication part for information exchange with a transmission part for wireless power transmission.

6 Claims, 7 Drawing Sheets

(56) References Cited

U.S. PATENT DOCUMENTS

| | | |
|---|---|---|
| 2008/0197802 A1 | 8/2008 | Onishi et al. |
| 2009/0001929 A1 | 1/2009 | Posamentier |
| 2010/0013322 A1* | 1/2010 | Sogabe et al. ............. 307/104 |
| 2011/0254379 A1* | 10/2011 | Madawala ............. 307/104 |
| 2012/0153733 A1* | 6/2012 | Schatz et al. ............. 307/104 |

OTHER PUBLICATIONS

Finkenzeller, Klaus, "RFID handbook: Fundamentals and applications in contactless Smart card and Identification", Jan. 1, 2003, pp. 29-59, ISBN: 0-470-84402-7, John Wiley & Sons, Ltd.

* cited by examiner

WIRELESS POWER TRANSMISSION DEVICE AND METHOD

CROSS-REFERENCE TO RELATED APPLICATION(S)

This application claims the benefit under 35 U.S.C. §119(a) of Korean Patent Application No. 10-2009-0130852, filed on Dec. 24, 2009, in the Korean Intellectual Property Office, the entire disclosure of which is incorporated herein by reference for all purposes.

BACKGROUND

1. Field

The following description relates to a wireless power transmission device and method, and more particularly, to a wireless power transmission device and method for transmitting and receiving information without any additional information transmission device.

2. Description of Related Art

Recently, a variety of portable electronic products have been released and have become widespread, along with development of information technologies (IT). When considering characteristics of portable electronic products, battery performance of these portable electronic products is emerging as an important issue. Portable electronic products, as well as household appliances, can function to wirelessly transmit data, but can only receive power provided through power lines.

Additionally, wireless power transmission technologies for supplying power in a wireless manner have been studied in recent years. Wireless energy transfer or wireless power occurs where electrical energy is transmitted from a power source to an electrical load without interconnecting wires. However, when considering characteristics of wireless configuration, a distance between a wireless power transmission device and a terminal is highly likely to vary over time, and requirements to match a resonator of the wireless power transmission device with a resonator of the terminal may also be changed.

To efficiently transmit power in a wireless manner, information for power transmission is required to be exchanged between the wireless power transmission device and the terminal. Therefore, there is a need for a new method to exchange information, to improve a wireless transmission efficiency.

SUMMARY

In one general aspect, there is provided a wireless power transmission device, including: a transmitter configured to wirelessly transmit power to a terminal, and a controller configured to control an amount of power transmitted wirelessly by the transmitter, based on transmission information transmitted to the terminal.

In the wireless power transmission device, the controller may include a switch, the switch configured to cut off or supply the power transmitted wirelessly to the terminal, depending on the transmission information.

In the wireless power transmission device, the controller may be further configured to control a transmission frequency, based on the transmission information.

In the wireless power transmission device, the controller may include a phase locked loop (PLL) circuit configured to control the transmission frequency.

In the wireless power transmission device, the controller may be further configured to control an internal impedance, based on the transmission information.

The wireless power transmission device may further include: a measuring unit configured to measure a reflected wave of a transmission signal transmitted to the terminal, and an analyzer configured to analyze, based on the measured reflected wave, terminal information received from the terminal.

In the wireless power transmission device, the measuring unit may include a directional coupler configured to measure the reflected wave.

In another general aspect, there is provided a terminal, including: a receiver configured to wirelessly receive power from a wireless power transmission device, and a controller configured to control an internal impedance based on terminal information transmitted to the wireless power transmission device.

In the terminal, the controller may include: a first load, a second load, and a switch connected to one of: the first load and the second load, depending on the terminal information.

The terminal may further include: a measuring unit configured to measure an amount of power received wirelessly from the wireless power transmission device, and an analyzer configured to analyze, based on the measured amount of power, transmission information received from the wireless power transmission device.

In another general aspect, there is provided a wireless power transmission method, including: wirelessly transmitting power to a terminal, and controlling an amount of power transmitted wirelessly to the terminal, based on transmission information transmitted to the terminal.

The wireless power transmission method may further include: measuring a reflected wave of a transmission signal transmitted to the terminal, and analyzing, based on the measured reflected wave, terminal information received from the terminal.

The wireless power transmission method may further include measuring the reflected wave with a directional coupler.

The wireless power transmission method may further include cutting off or supplying the power transmitted wirelessly to the terminal, depending on the transmission information.

The wireless power transmission method may further include controlling a transmission frequency, based on the transmission information.

The wireless power transmission method may further include controlling an internal impedance, based on the transmission information.

In another general aspect, there is provided a wireless power transmission method, including: wirelessly receiving power from a wireless power transmission device, and controlling an internal impedance based on terminal information transmitted to the wireless power transmission device.

The wireless power transmission method may further include connecting a switch to one of: a first load and a second load, depending on the terminal information.

The wireless power transmission method may further include: measuring an amount of power received wirelessly from the wireless power transmission device, and analyzing, based on the measured amount of power, transmission information received from the wireless power transmission device.

Other features and aspects may be apparent from the following detailed description, the drawings, and the claims.

Figure 1:
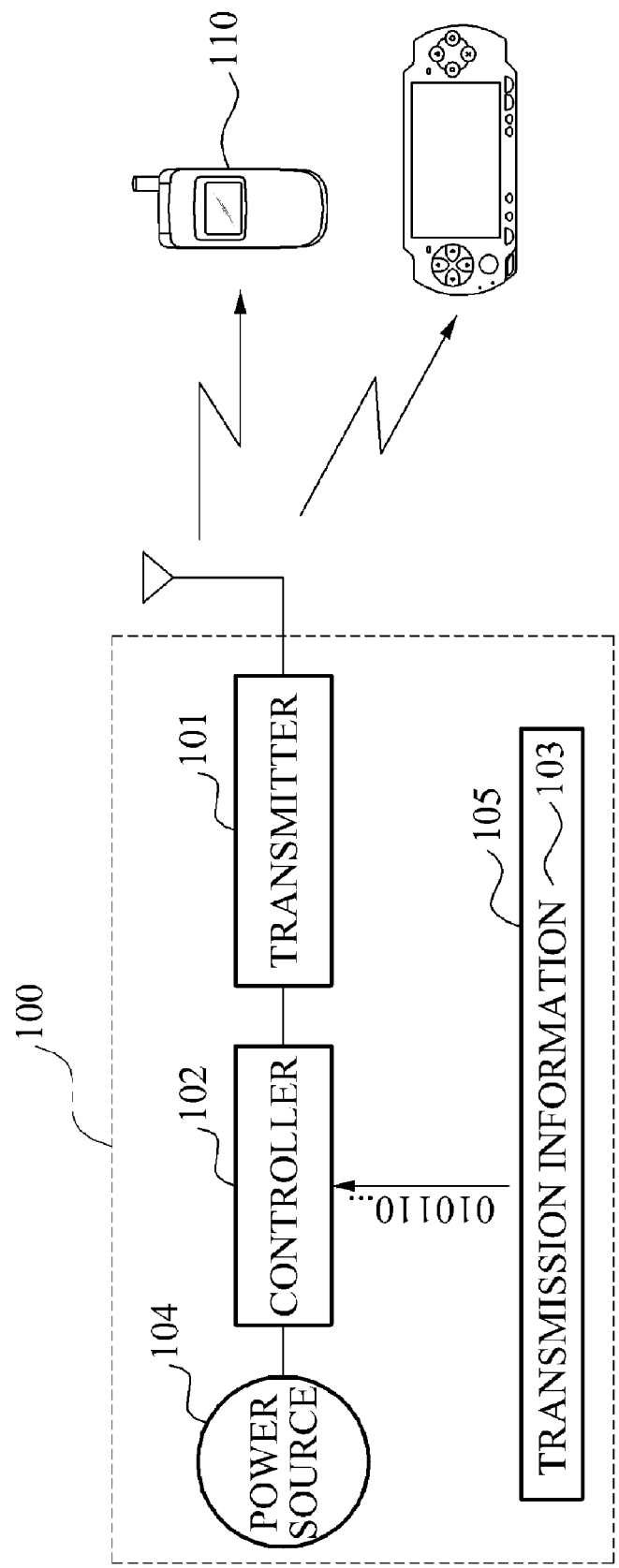
FIG. 1 is a diagram illustrating a configuration of an example wireless power transmission device.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses, and/or methods described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. It should be appreciated that the use of binary "0" and "1" may be reversed, as appropriate. Also, description of well-known functions and constructions may be omitted for increased clarity and conciseness.

FIG. 1 illustrates a configuration of a wireless power transmission device 100.

Referring to FIG. 1, the wireless power transmission device 100 may include a transmitter 101 and a controller 102. The wireless power transmission device 100 may further include a power source 104.

The wireless power transmission device 100 may be any device capable of wirelessly transmitting power to a terminal 110. Additionally, the wireless power transmission device 100 may be inserted as a module into the terminal 110.

The terminal 110 may be any device capable of being operated by power, e.g., a television (TV), a mobile phone, a game console, a refrigerator, or other devices.

The transmitter 101 may wirelessly transmit power to the terminal 110.

The controller 102 may control an amount of the power transmitted wirelessly by the transmitter 101, based on transmission information 103 transmitted to the terminal 110. For example, the wireless power transmission device 100 may transmit the transmission information 103 to the terminal 110 by controlling the amount of the power, rather than by using an additional device for transmission of the transmission information 103. For example, in response to the transmission information 103 being "0", the controller 102 may control the amount of the power to be reduced, or in response to the transmission information being "1", the controller 102 may control the amount of the power to be increased. It should be appreciated that the use of "0" and "1" is for example purposes only, and the specific numbers may be reversed or otherwise changed.

The "transmission information 103" refers to information to be transmitted by the wireless power transmission device 100 to the terminal 110. The transmission information 103 may include information regarding the wireless power transmission device 100, for example, an identification (ID) and a type for the wireless power transmission device 100, information regarding a transmission range which may enable the wireless power transmission device 100 to wirelessly transmit power, and information regarding whether the wireless power transmission device 100 is successfully matched with the terminal 110 when wirelessly transmitting the power. However, there may be no limitation to information required or desired for the wireless power transmission device 100 to transmit the power wirelessly to the terminal 110; accordingly, the transmission information 103 may include various types of information which the wireless power transmission device 100 desires to transmit to the terminal 110, regardless of contents of the information to be transmitted. Depending on embodiments, the transmission information 103 may be binary scale data, although embodiments are not limited thereto.

According to an aspect, the wireless power transmission device 100 may further include an input unit 105 to receive the transmission information 103.

The controller 102 may control a transmission frequency based on the transmission information 103. The controller 102 may also control the amount of the power transmitted to the terminal 110, by controlling the transmission frequency. Additionally, the controller 102 may include a phase locked loop (PLL) circuit, to control the transmission frequency using the PLL circuit.

In addition, the controller 102 may control an internal impedance of the wireless power transmission device 100 based on the transmission information 103. The controller 102 may also control the amount of the power transmitted to the terminal 110, by controlling the internal impedance.

Figure 2:
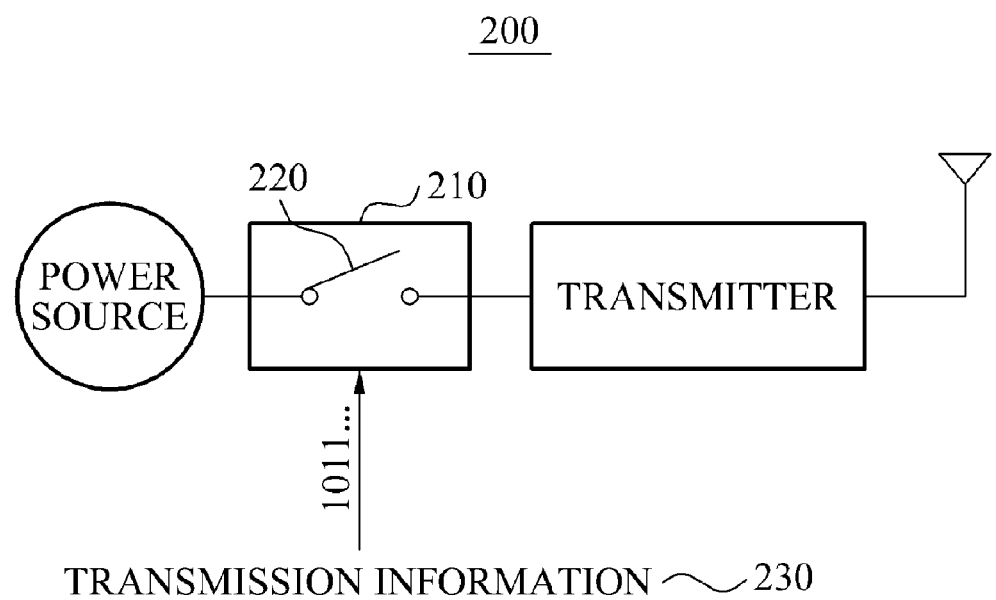
FIG. 2 is a diagram illustrating a configuration of another example wireless power transmission device.

FIG. 2 illustrates a configuration of a wireless power transmission device 200.

Referring to FIG. 2, a controller 210 of the wireless power transmission device 200 may include a switch 220.

The switch 220 may cut off or supply power (e.g., from the power source 104 of FIG. 1) which may be transmitted by the wireless power transmission device 200 wirelessly to a terminal, depending on transmission information 230. Depending on embodiments, in response to the transmission information 230 being "0", the switch 220 may be opened to cut off the wirelessly transmitted power, or alternatively in response to the transmission information 230 being "1", the switch 220 may be closed to supply the wirelessly transmitted power.

Figure 3:
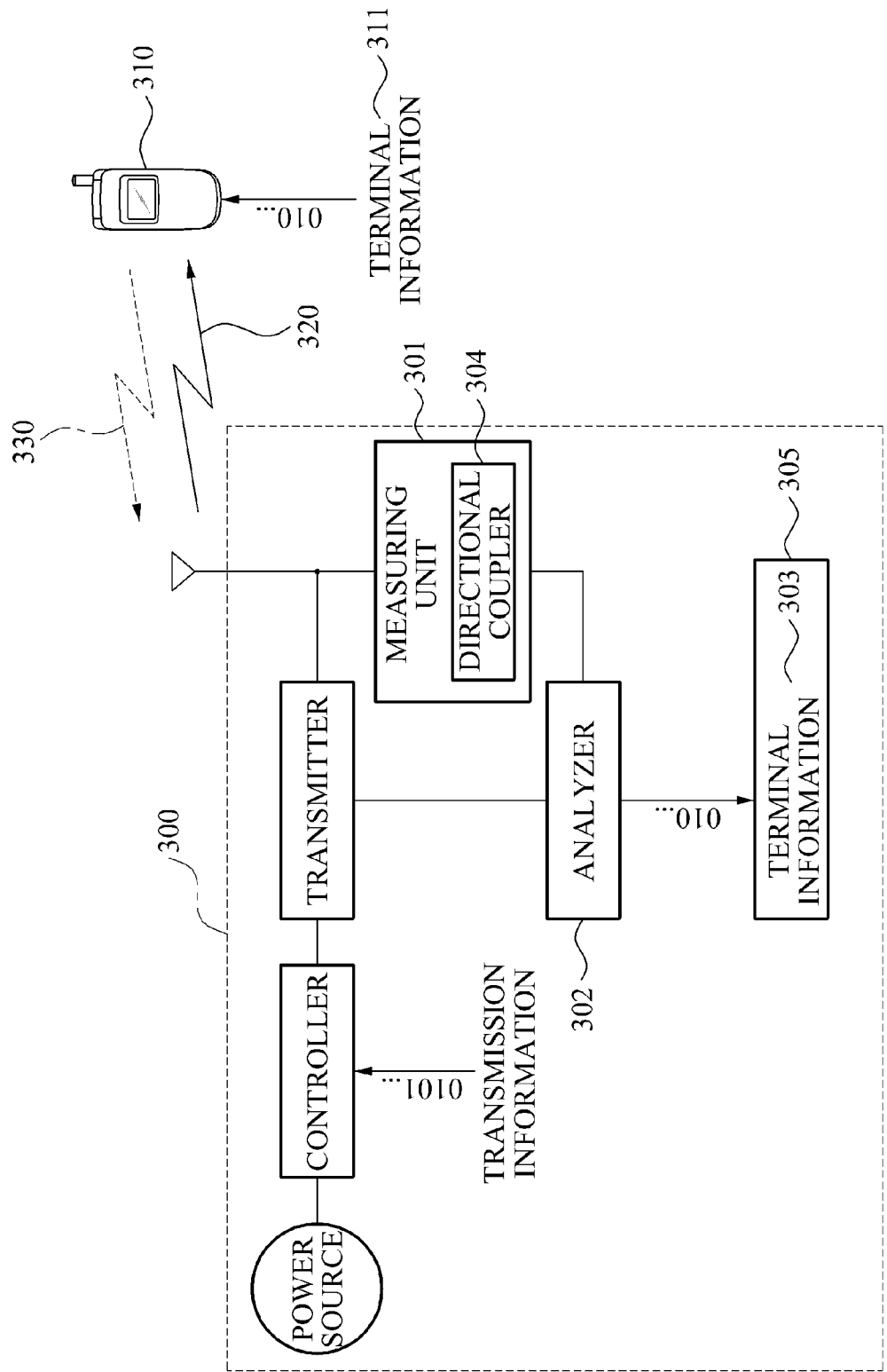
FIG. 3 is a diagram illustrating a configuration of still another example wireless power transmission device.

FIG. 3 illustrates a configuration of a wireless power transmission device 300.

Referring to FIG. 3, the wireless power transmission device 300 may include a measuring unit 301 and an analyzer 302. The wireless power transmission device 300 may further include a power source (e.g., power source 104), a controller (e.g., controller 102 or 200), and a transmitter (e.g., transmitter 101).

The wireless power transmission device 300 may send a transmission signal 320 to a terminal 310, in order to wirelessly transmit power to the terminal 310. In one example, a part of the transmission signal 320 may be reflected and returned, which is referred to as a "reflected wave 330."

The measuring unit 301 may measure the reflected wave 330 of the transmission signal 320 transmitted to the terminal 310. Depending on embodiments, the measuring unit 301 may include a directional coupler 304, to measure the reflected wave 330 using the directional coupler.

Based on the reflected wave 330 measured by the measuring unit 301, the analyzer 302 may analyze terminal information 311 received from the terminal 310.

The terminal 310 may transmit the terminal information 311 to the wireless power transmission device 300. An example of a terminal for transmitting terminal information will be further described with reference to FIG. 4.

Figure 4:
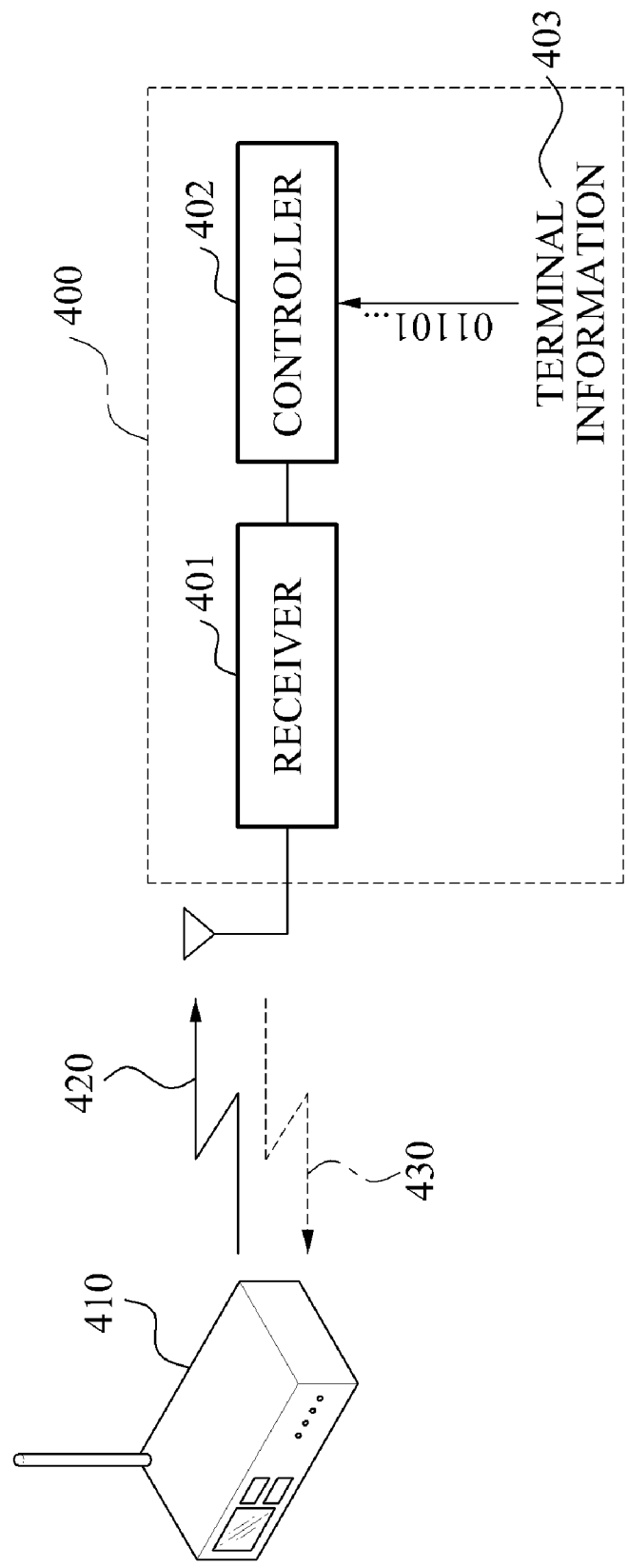
FIG. 4 is a diagram illustrating a configuration of an example terminal.

FIG. 4 illustrates a configuration of a terminal 400.

Referring to FIG. 4, the terminal 400 may include a receiver 401 and a controller 402.

The receiver 401 may wirelessly receive power from a wireless power transmission device 410.

The controller 402 may control an internal impedance of the terminal 400, based on terminal information 403 transmitted to the wireless power transmission device 410. For example, the terminal 400 may send the terminal information 403 to the wireless power transmission device 410 by controlling the internal impedance and controlling a reflected wave 430 of a transmission signal 420 received from the wireless power transmission device 410, rather than by using an additional device for transmission of the terminal information 403. For example, in response to the terminal information 403 being "0", the controller 402 may control the internal impedance such that a power of the reflected wave 430 may be reduced. Alternatively, in response to the terminal information 403 being "1", the controller 402 may control the internal impedance such that the power of the reflected wave 430 may be increased. Additionally, the controller 402 may control the internal impedance such that an amplitude of the reflected wave 430 may increase or decrease, depending on the terminal information 403.

The "terminal information 403" refers to information to be transmitted by the terminal 400 to the wireless power transmission device 410. The terminal information 403 may include information regarding whether the terminal 400 may currently require power, information regarding an amount of power that may be required by the terminal 400 in response to the terminal 400 may require the power, information regarding whether the terminal 400 is sufficiently matched with the wireless power transmission device 410 when wirelessly receiving the power, and information regarding a charging rate of the terminal 400. However, there may be no limitation to information that may be desired for the terminal 400 to receive power wirelessly from the wireless power transmission device 410; accordingly, the terminal information 403 may include various types of information which the terminal 400 desires to transmit to the wireless power transmission device 410, regardless of contents of the information to be transmitted by the terminal 400. Depending on embodiments, the terminal information 403 may be binary scale data, although embodiments are not limited thereto.

According to an aspect, the terminal 400 may further include an input unit (e.g., input unit 105 of FIG. 1) to receive the terminal information 403.

Referring back to FIG. 3, the analyzer 302 may analyze the received terminal information 311, based on information on at least one of a variation in power and amplitude of the reflected wave 330 measured by the measuring unit 301. Depending on embodiments, the wireless power transmission device 300 may further include an output unit 305 to output the terminal information 303 analyzed by the analyzer 302.

Figure 5:
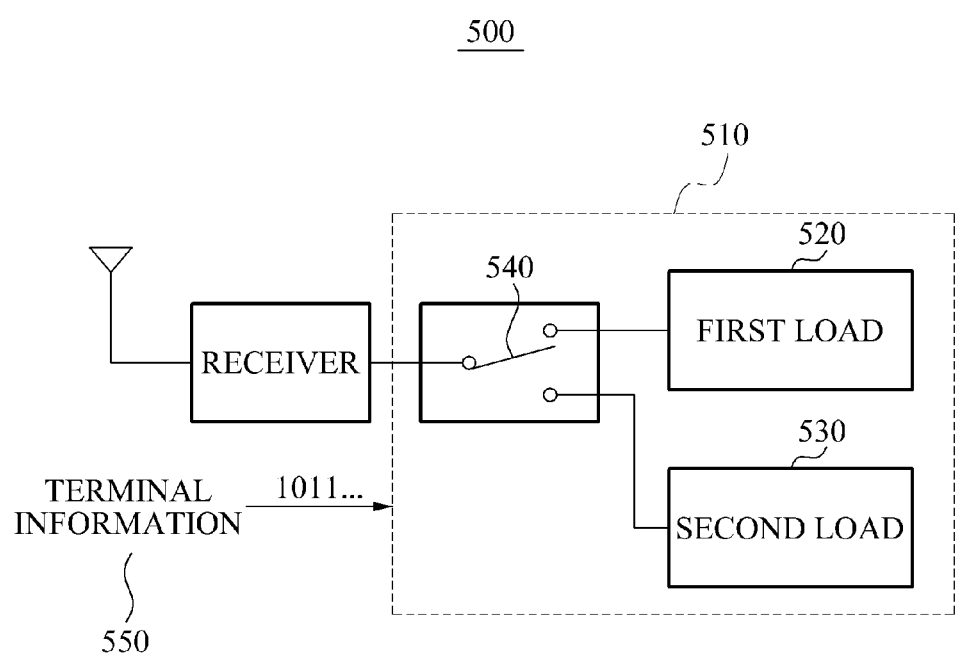
FIG. 5 is a diagram illustrating a configuration of another example terminal.

FIG. 5 illustrates a configuration of a terminal 500.

Referring to FIG. 5, a controller 510 of the terminal 500 may include a first load 520, a second load 530, and a switch 540.

The switch 540 may be connected to either the first load 520 or the second load 530, depending on terminal information 550. In one example, in response to the terminal information 550 being "0", the switch 540 may be connected to the first load 520, and in response to the terminal information 550 being "1", the switch 540 may be connected to the second load 530.

Figure 6:
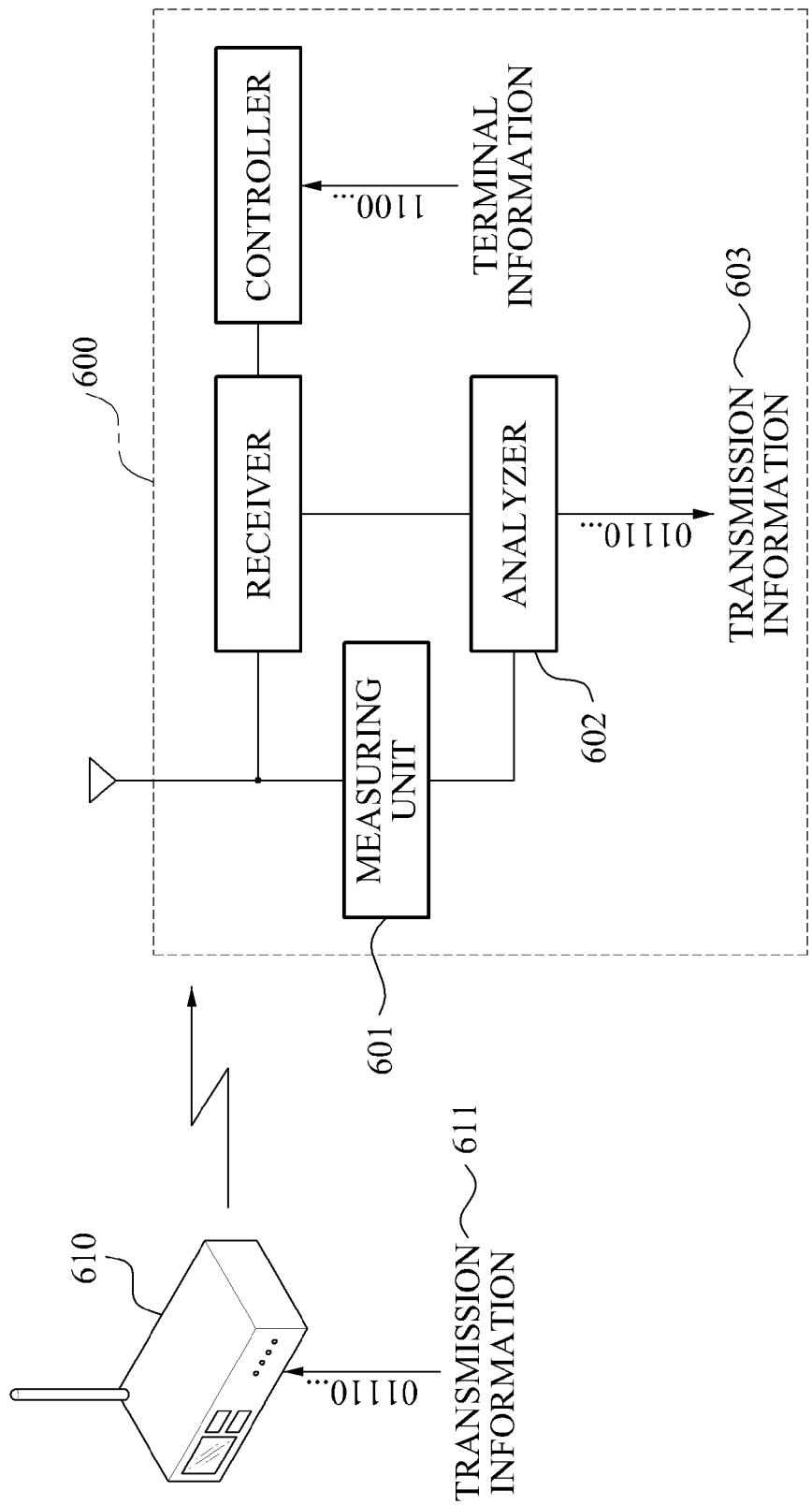
FIG. 6 is a diagram illustrating a configuration of still another example terminal.

FIG. 6 illustrates a configuration of a terminal 600.

Referring to FIG. 6, the terminal 600 may include a measuring unit 601 and an analyzer 602.

The measuring unit 601 may measure an amount of power received wirelessly from a wireless power transmission device 610.

Based on the amount of power measured by the measuring unit 601, the analyzer 602 may analyze transmission information 611 received from the wireless power transmission device 610. For example, the analyzer 602 may analyze the transmission information 611 based on a variation in the measured amount of power. Depending on embodiments, the terminal 600 may further include an output unit (e.g., output unit 305 of FIG. 3) to output transmission information 603 analyzed by the analyzer 602.

Figure 7:
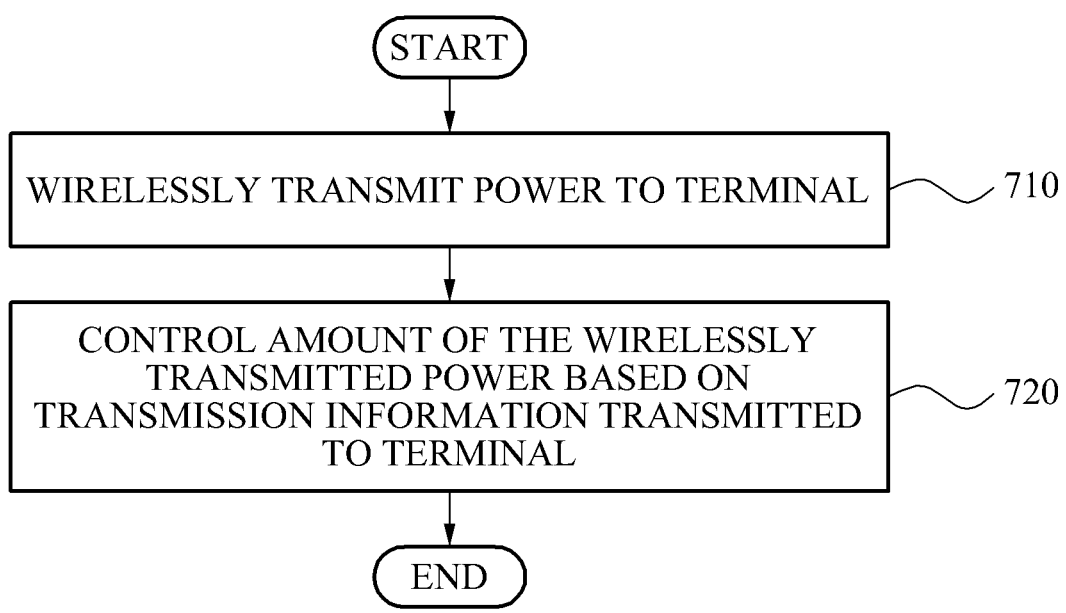
FIG. 7 is a flowchart illustrating an example wireless power transmission method.

FIG. 7 illustrates a wireless power transmission method.

Referring to FIG. 7, power may be wirelessly transmitted to a terminal in operation 710.

An amount of power transmitted wirelessly to the terminal may be controlled based on transmission information transmitted to the terminal in operation 720. For example, the amount of power may be controlled by controlling internal impedance and controlling a reflected wave of a transmission signal received from a wireless power transmission device, rather than an additional device for transmission of the transmission information being used, such that the transmission information may be transmitted to the terminal. For example, in response to the transmission information being "0", the amount of power may be controlled to be reduced, or in response to the transmission information being "1", the amount of power may be controlled to be increased.

According to an aspect, the wireless power transmission method of FIG. 7 may further include receiving the transmission information before operation 720.

According to the wireless power transmission method of FIG. 7, a transmission frequency may be controlled based on the transmission information; accordingly, the amount of power may also be controlled. Additionally, the transmission frequency may be controlled using a PLL circuit.

According to the wireless power transmission method of FIG. 7, an internal impedance may be controlled based on the transmission information; accordingly, the amount of power may also be controlled.

Additionally, according to the wireless power transmission method of FIG. 7, a reflected wave of a transmission signal transmitted to the terminal may be measured. Depending on embodiments, a directional coupler may be used to measure the reflected wave.

Furthermore, according to the wireless power transmission method of FIG. 7, terminal information received from the terminal may be analyzed based on the reflected wave as measured. Depending on embodiments, the terminal information may be analyzed based on information on at least one of a variation in power and amplitude of the reflected wave.

Depending on embodiments, the wireless power transmission method of FIG. 7 may further include outputting the analyzed terminal information. The method of the example described in FIG. 7 may use any of the above-described devices for its operation or any devices consistent with the operation described herein.

As a non-exhaustive illustration only, the devices, e.g., the wireless power transmission device 100 or the terminal 110, described herein may refer to mobile devices such as a cellular phone, a personal digital assistant (PDA), a digital camera, a portable game console, and an MP3 player, a portable/personal multimedia player (PMP), a handheld e-book, a portable tablet and/or laptop PC, a global positioning system (GPS) navigation, and devices such as a desktop PC, a high definition television (HDTV), an optical disc player, a setup and/or set top box, and the like consistent with that disclosed herein.

A number of example embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A terminal comprising:
   a receiver configured to wirelessly receive power from a wireless power transmission device; and
   a controller configured to control an internal impedance based on terminal information and to transmit the terminal information to the wireless power transmission device via a reflected wave of a transmission signal received from the wireless power transmission device, wherein:
   the terminal information identifies a charging rate of the terminal,
   the controller controls the internal impedance based on the charging rate of the terminal, and
   the controller comprises:
      a first load,
      a second load, and
      a switch configured to connect to either the first load or the second load, based on the terminal information.

2. The terminal of claim 1, further comprising:
   a measuring unit configured to measure an amount of the power received wirelessly from the wireless power transmission device; and
   an analyzer configured to analyze the measured amount of the power to determine transmission information received from the wireless power transmission device via the power transmission.

3. The terminal of claim 1, wherein the wireless power transmission device receives, from the terminal, the reflected wave, measures the reflected wave, and determines the terminal information received from the terminal via the received reflected wave, based on the measured reflected wave.

4. The terminal of claim 1, wherein the terminal information comprises information of whether the terminal requires power, an amount of power that is required by the terminal, and information of whether the terminal is matched with the wireless power transmission device when wirelessly receiving the power.

5. A wireless power transmission method of a terminal, the method comprising:
   wirelessly receiving power from a wireless power transmission device;
   controlling an internal impedance based on terminal information; and
   transmitting the terminal information to the wireless power transmission device via a reflected wave of a transmission signal received from the wireless power transmission device, wherein:
   the terminal information identifies a charging rate of the terminal,
   the controller controls the internal impedance based on the charging rate of the terminal, and
   the controlling of the internal impedance comprises connecting a switch to a first load or a second load, based on the terminal information.

6. The wireless power transmission method of claim 5, further comprising:
   measuring an amount of the power received wirelessly from the wireless power transmission device; and
   analyzing the measured amount of the power to determine transmission information received from the wireless power transmission device via the power transmission.

* * * * *